(12) United States Patent
Godwin

(10) Patent No.: US 6,741,834 B1
(45) Date of Patent: May 25, 2004

(54) DEVICE AND METHOD TO IMPROVE INTEGRATED PRESENTATION OF EXISTING RADIO SERVICES AND ADVANCED MULTIMEDIA SERVICES

(75) Inventor: John P. Godwin, Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 457 days.

(21) Appl. No.: 09/587,792

(22) Filed: Jun. 6, 2000

(51) Int. Cl.⁷ ................................................. H04N 7/14
(52) U.S. Cl. .................... 455/3.01; 455/7; 455/427; 725/63
(58) Field of Search ............................... 455/3.02, 3.03, 455/427, 428, 12.1, 7; 370/316; 725/86, 87, 73, 45, 66

(56) References Cited

U.S. PATENT DOCUMENTS 6,009,116 A * 12/1999 Bednarek et al. ............ 375/130
6,018,649 A * 1/2000 Ruhl ........................ 455/186.1
6,160,545 A * 12/2000 Eyer et al. ................... 345/721
6,266,329 B1 * 7/2001 Lazaris-Brunner et al. . 370/316
6,347,216 B1 * 2/2002 Marko et al. ............... 455/12.1
6,510,317 B1 * 1/2003 Marko et al. ................ 455/428

* cited by examiner

Primary Examiner—Nay Maung
Assistant Examiner—Nick Corsaro
(74) Attorney, Agent, or Firm—John A. Crook; Georgann S. Grunebach

(57) ABSTRACT

A method and apparatus for providing an integrated presentation of existing media program services and secondary media program services is described. The method comprises the steps of accepting a election of a secondary media program transmitted on a secondary media program channel; accessing a mapping to determine a primary media program channel associated with the selected secondary media program channel; commanding a first tuner module to receive conditional access information associated with the primary media program channel from the primary service provider; evaluating the conditional access information to determine if a second tuner is authorized to receive the secondary media program channel; and commanding a second tuner module to receive the secondary media program if the second tuner is authorized to receive the secondary media program channel.

24 Claims, 11 Drawing Sheets

DEVICE AND METHOD TO IMPROVE INTEGRATED PRESENTATION OF EXISTING RADIO SERVICES AND ADVANCED MULTIMEDIA SERVICES

BACKGROUND OF THE INVENTION

1. Field of the Invention

The present invention relates to systems and methods for providing program material to subscribers, and in particular to a method and system for integrating a national media program broadcast with existing regional radio broadcasts.

2. Description of the Related Art

Media programming, such as audio programs, are distributed to viewers by a variety of broadcasting methods. These methods include traditional amplitude modulated (AM) and frequency modulated (FM) analog broadcast radio, and audio channels carried by direct broadcast television providers such as DIRECTV Inc. In the near future, digital broadcast radio such as the Satellite Digital Audio Radio Service (SDARS) envisioned by XM RADIO, Inc., will also be available. When it becomes available, SDARS will provide subscribers with new, previously unavailable high quality media services, even in mobile environments like the automobile. The SDARS system uses one or more satellites to broadcast audio and advanced multimedia programs. The satellite broadcasts can be received directly by subscriber receivers at home, at business locations, or in mobile vehicles. The satellite broadcasts will also be received and retransmitted by terrestrial repeaters to provide improved coverage and availability. This technique is especially useful for mobile receivers operated in urban areas with multi-story structures, which may cause shadowing.

SDARS provides superior transmission quality and diversity of choice of programming. However, many potential customers have become accustomed to listening to media programs transmitted by their local AM and FM radio stations, and are likely to remain loyal to these media programs. This listener allegiance to existing regional AM and FM radio programming from regional service providers may slow the acceptance of SDARS. One potential solution to this problem would be to simply broadcast all regional programs to all subscribers. However, this would present a confusing array of uninteresting media programs to a typical user, and requires agreements with a multitude of rights holders and requires enormous system capacity. What is needed is a system and method for making regional broadcasts "appear" available on digital satellite broadcasts to those listeners within the reception area of the regional broadcast provider and to provide some local content to the SDARS customer via the system itself. The present invention satisfies that need.

SUMMARY OF THE INVENTION

In summary, the present invention describes a system and method for receiving regional media programs transmitted by regional media providers. One embodiment of the present invention comprises the steps of receiving a signal in a receiver disposed in one of a plurality of local broadcast regions within a national broadcast region, wherein the signal includes national media programs (optionally including a corresponding electronic program guide) intended for reception in the national broadcast region, and regional media programs (optionally including a corresponding electronic program guide) intended for reception only in the local broadcast regions, determining the local broadcast region, and providing only the regional media programs intended for reception in the determined local broadcast region.

In one embodiment, the apparatus comprises a receiver for receiving regional media programs in one of a plurality of local broadcast regions within a national broadcast region. The receiver comprises a tuner for receiving a first signal from a satellite, wherein the first signal comprises national media programs (and optional electronic program guides) intended for reception in the national broadcast region and regional media programs (and optional electronic program guides) intended for reception only in the local broadcast region, a second tuner module for receiving a second signal from a repeater serving the local broadcast region, the second signal comprising at least one regional media program and a local broadcast ID, a location module for determining the local broadcast region, and a controller module for providing only that local media programs intended for reception in the determined local broadcast region.

In addition to distributing regional media programs, the present invention provides a device and method for distributing channel and program information (both text and graphics) for existing analog radio services (such as the AM and FM services provided in the United States), and to enable the presentation of a uniform electronic program guide (EPG) to be provided for both the existing services and the new services. The invention provides EPG information for the existing services via a nationwide satellite broadcast (e.g. via SDARS) and also via a repeater network such as the SDARS terrestrial repeater network. The repeater network can simply rebroadcast the satellite broadcast, or alternatively, filter the national broadcast, store, and replay the newly created local multimedia information (television, audio, data, text, graphics, etc.) and EPG data solely to the local area. The EPG information for all channels (local AM, local FM, national and regional media programs) are received and displayed by the user's receiver.

Thus, the present invention allows accelerated acceptance of SDARS-like systems because customers can experience their familiar, favorite, AM and FM channels in the same "linear space" as the new channels. In one embodiment, the present invention also presents an EPG that has roughly the same detail regarding local and national stations. The present invention is also beneficial to existing media service providers, because it allows the media to currently broadcast on AM and FM channels to be provided to customers who would otherwise have been dissuaded by poor or marginal reception quality.

In a further embodiment, new regional programs are broadcast nationally and the locally re-broadcast repetitively via the repeater network. This reduces the local subscriber's "waiting time" for information of local interest.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Figure 1:
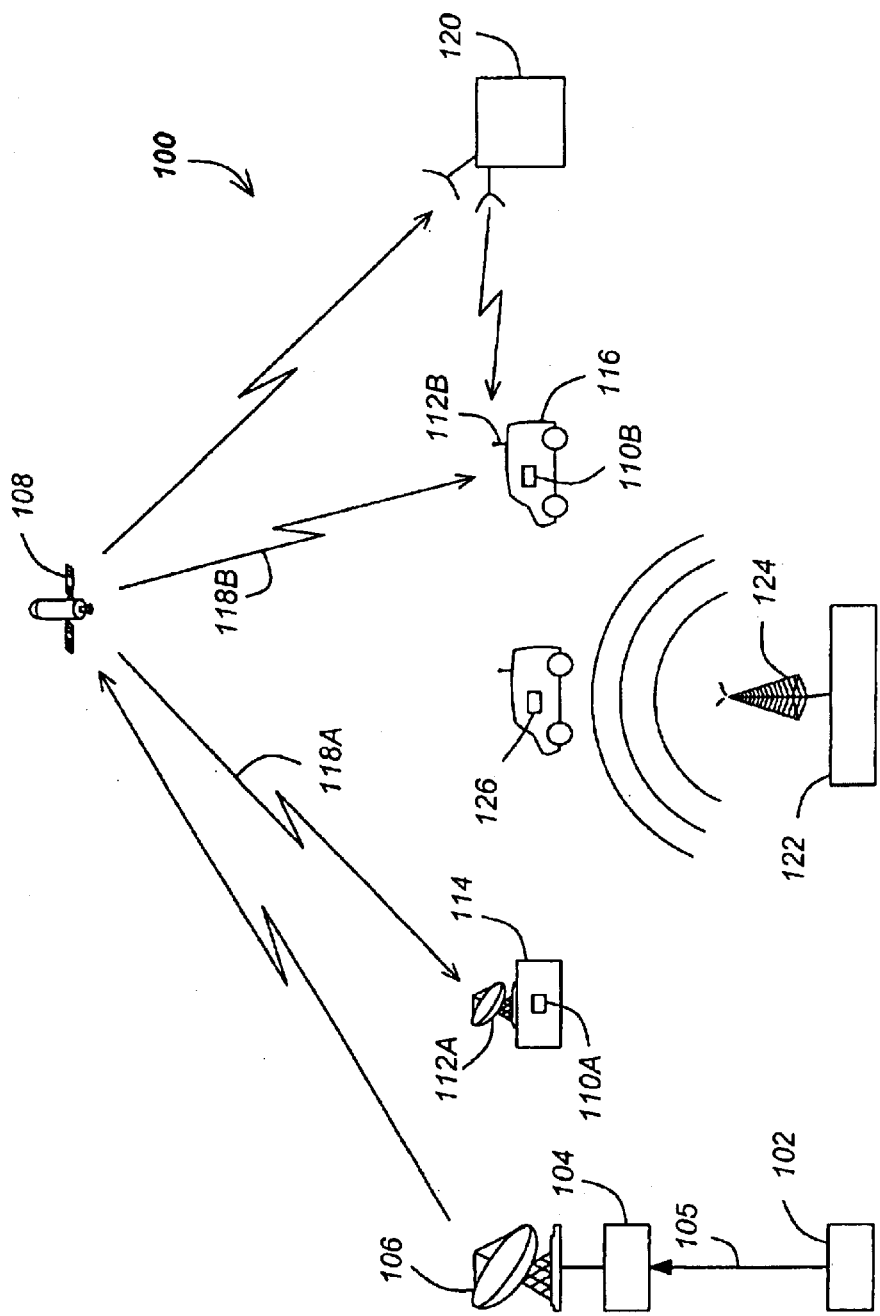
FIG. 1 is a diagram showing an overview of a media distribution system.

FIG. 1 is a diagram illustrating an overview of a media program distribution system 100. The media program distribution system 100 comprises a control center 102 in communication with an uplink center 104 via a ground link 105. The control center 102 provides program material to the uplink center 104, and coordinates with the subscriber receivers 110A–110B to provide program services.

The uplink center 104 receives program material and program control information from the control center 102, and using an uplink antenna 106, transmits the program material and program control information to the satellite 108. The satellite 108 receives and processes this information, and transmits the media programs and control information to subscriber receivers 110A and 110B, via downlinks 118A and 118B, respectively. A subscriber receiver antenna (112A and 112B, respectively) receives this information and provides a signal to the subscriber receivers 110A and 110B.

Subscriber receiver antenna 112A and subscriber receiver 1120A comprise a typically immobile subscriber installation 114 such as that which would be used in a home. Subscriber receiver antenna 112B and subscriber receiver 110B comprise a typically mobile subscriber installation 116 such as that which would be used in a vehicle. In addition to the direct broadcasts from the satellite 108 to the subscriber receivers 110A and 110B as described above, the media program distribution system also comprises one or more repeaters 120. The repeaters 120 receive broadcast signals from the satellite 108, and re-transmit the media programs in the broadcast signals to subscriber receivers 110A and 110B. Typically, the repeaters 120 are especially useful in mobile applications, since they can re-transmit the signals received from the broadcast satellites at different angle frequencies and with different modulation techniques that are complementary to the satellite delivery path.

In addition to the foregoing, there are existing media service providers 122 (i.e. existing AM and FM radio stations) that broadcast media programs via broadcast transmitters 124 to standard (i.e. AM and/or FM) receivers 126. As shown in FIG. 1, standard receivers 126 can be mobile or at a fixed location, such as a house.

The media program distribution system 100 can comprise a plurality of satellites 108 in order to provide wider terrestrial coverage, to provide additional channels, or to provide additional bandwidth per channel. In one embodiment of the invention, each satellite comprises a plurality of transponders to receive and transmit program material and other control data from the uplink center 104 and provide it to the subscriber receivers 110A and 110B (hereinafter collectively referred to as subscriber receiver(s) 110). However, using data compression and multiplexing techniques the program channel capabilities are far greater than the number of satellite transponders.

While the invention disclosed herein will be described with reference to a satellite based media program distribution system 100, the present invention may also be practiced with terrestrial-based transmission of program information, whether by broadcasting means, cable, or other means. Further, the different functions collectively allocated between the control center 102 and the uplink center 104 as described above can be reallocated as desired without departing from the intended scope of the present invention.

Although the foregoing has been described with respect to an embodiment in which the program material delivered to the subscriber is audio program material, the foregoing method can be used to deliver program material comprising purely television, data or multimedia.

Figure 2:
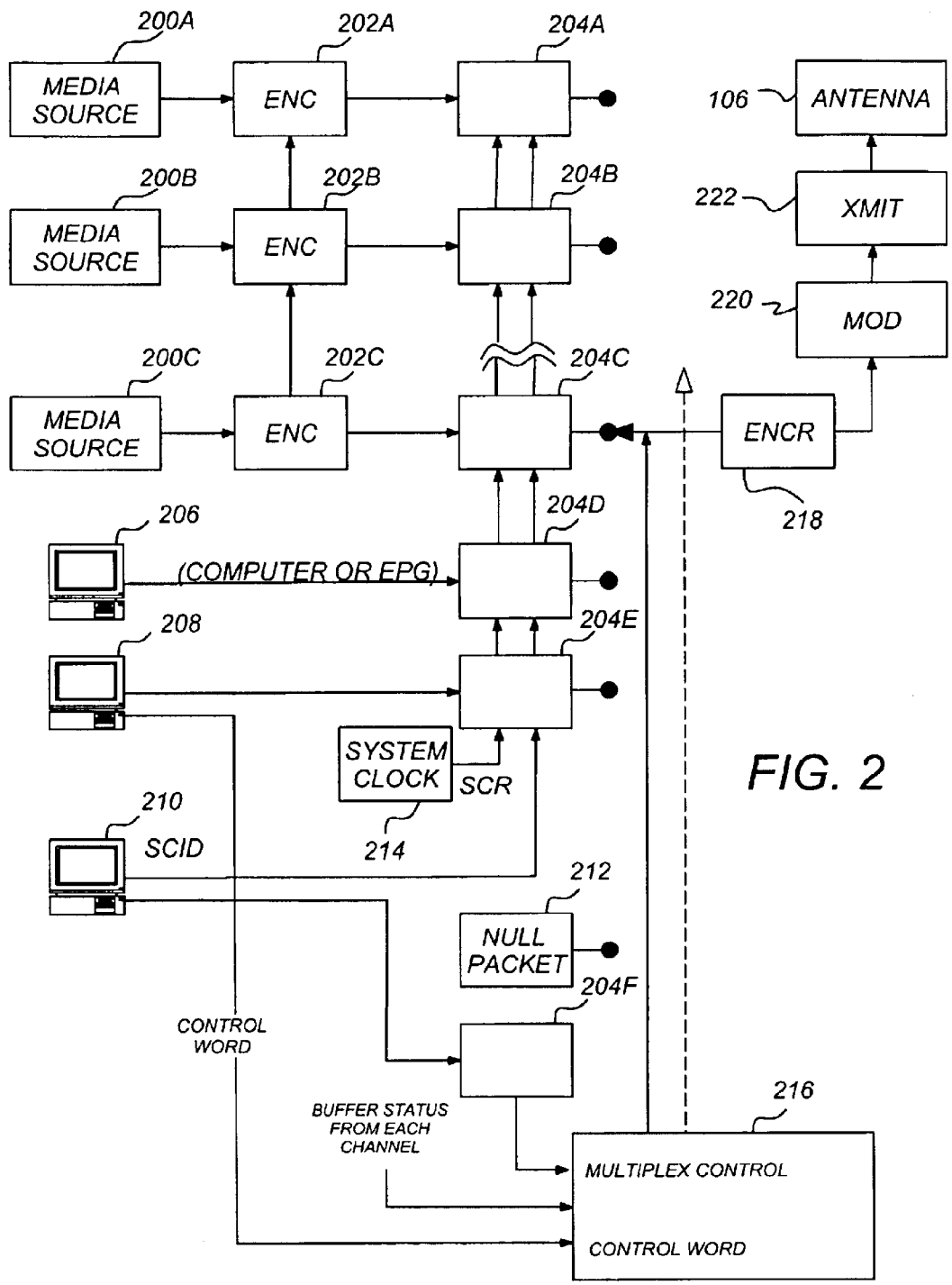
FIG. 2 is a block diagram showing a typical uplink configuration for a single satellite transponder.

FIG. 2 is a block diagram showing a typical uplink configuration for a single satellite 108 transponder, showing how media programs are uplinked to the satellite 108 by the control center 102 and the uplink center 104. FIG. 2 shows three audio channels, and a data channel from a computer data source 206.

The audio channels are provided by a program source of audio material 200A–200C (collectively referred to hereinafter as audio source(s) 200). The data from each audio program source 200 is optionally provided to encoders 202A–202C (collectively referred to hereinafter as encoder (s) 202). The data channel which can include EPG data, can be subjected to a similar compression scheme by an encoder (not shown), but such compression is usually either unnecessary, or performed by computer programs in the computer domain (for example, text compression could be performed within the source computer). After encoding by the encoders 202, the signals are converted into data packets by a packetizer 204A–204F (collectively referred to hereinafter as packetizer(s) 204) associated with each source 200.

The data packets are assembled using a reference from the system clock 214 (SCR), and from the conditional access manager 208, which provides a control word to the packetizers 204 and to the controller 216. The control word is used to determine which media program channels will be presented to the subscriber. Another processor 210 manages service channel IDs (SCIDs) for use in generating the data packets, and provides the SCIDs to the packetizers 204 and to the controller 216. These data packets are then multiplexed into a serial stream and transmitted.

Figure 3A:
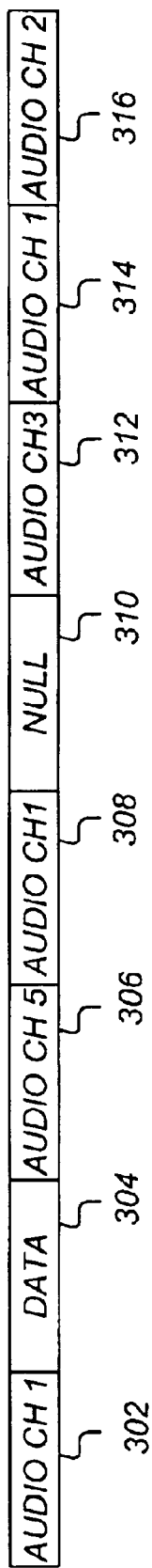
FIG. 3A is a diagram of a representative data stream received from a satellite.

FIG. 3A is a diagram of a representative data stream. The first packet segment 302 comprises information from audio channel 1 (data coming from, for example, the first audio program source 200A). The next packet segment 304 comprises computer data information that was obtained, for example from the computer data source 206. The next packet segment 306 comprises information from audio channel 5 (from one of the program sources 200), and the next packet segment includes information from audio channel 1 (again, coming from program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The subscriber receiver 110 receives these signals, and by scanning incoming packet headers for the desired SCIDs, reassembles the packets to regenerate the program material for each of the channels. As shown in FIG. 3A, null packets created by the null packet module 212 may be inserted into the data stream as desired to provide a continuous stream.

Figure 3B:
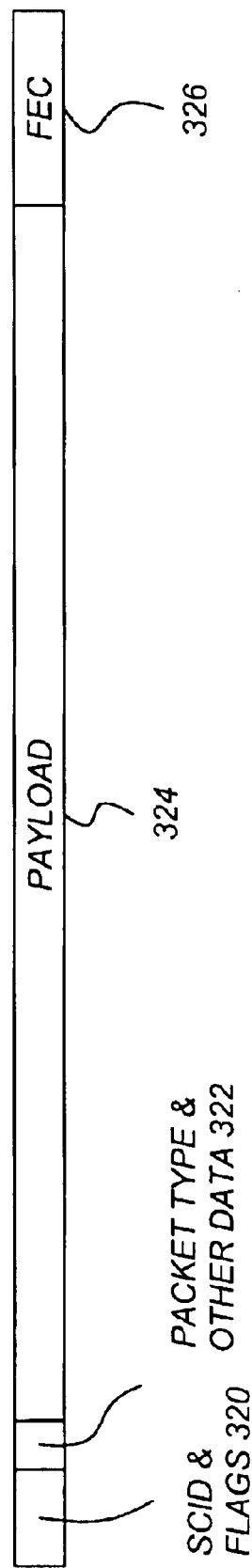
FIG. 3B is a diagram illustrating the structure of a data packet.

FIG. 3B is a diagram of a data packet. Each data packet (e.g. 302–316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and other header information. The packet type identifies the packet as one of the four data types (video, audio, data, or null). When combined with the SCID, the packet type determines how the data packet will be processed. The next packet segment 324 comprises 127 bytes of payload data, which is a portion of the program provided by the program source 200. The final packet segment 326 is data required to perform forward error correction.

Figure 4:
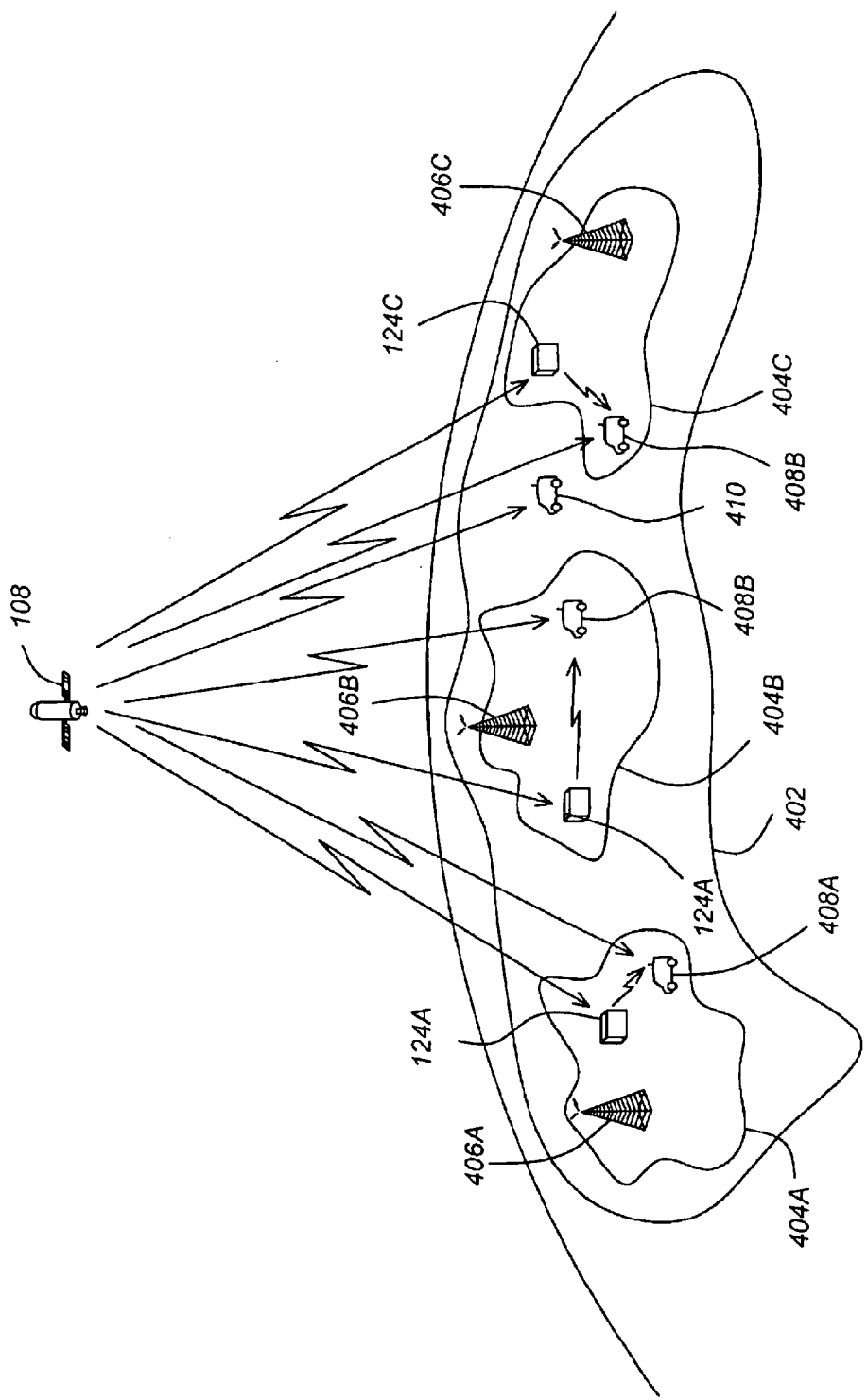
FIG. 4 is a diagram presenting a depiction of broadcast regions.

FIG. 4 is a diagram showing a depiction of broadcast regions. The satellite 108 broadcasts signals to receivers disposed in an area hereinafter referred to as a national broadcast region 402. Although the term "national" is used to refer to this broadcast region in this disclosure, the region need have no correlation whatsoever with national boundaries. As used herein, the national broadcast region 402 describes an area which may include multiple regions, in which broadcasts from one or more of the satellites 108 are intended to be received by terrestrial receivers disposed therein. The national broadcast region comprises one or more local broadcast regions 404A–404C (hereinafter alternatively referred to as regional broadcast region(s) 404). Regional broadcast regions 404 are areas defined by the service area of regional media providers who, using regional media program transmitters 406A–406C, broadcast regional media programs to listeners 408A–408B within the respective service areas.

As described with respect to FIG. 1, in the media program distribution system 100 the satellite 108 transmits media programs to listeners 410 outside any of the regional broadcast regions 404 directly by satellite 108, and transmits media programs to listeners 408A–408B inside the local broadcast regions directly and via repeaters 124A–124C.

Figure 5:
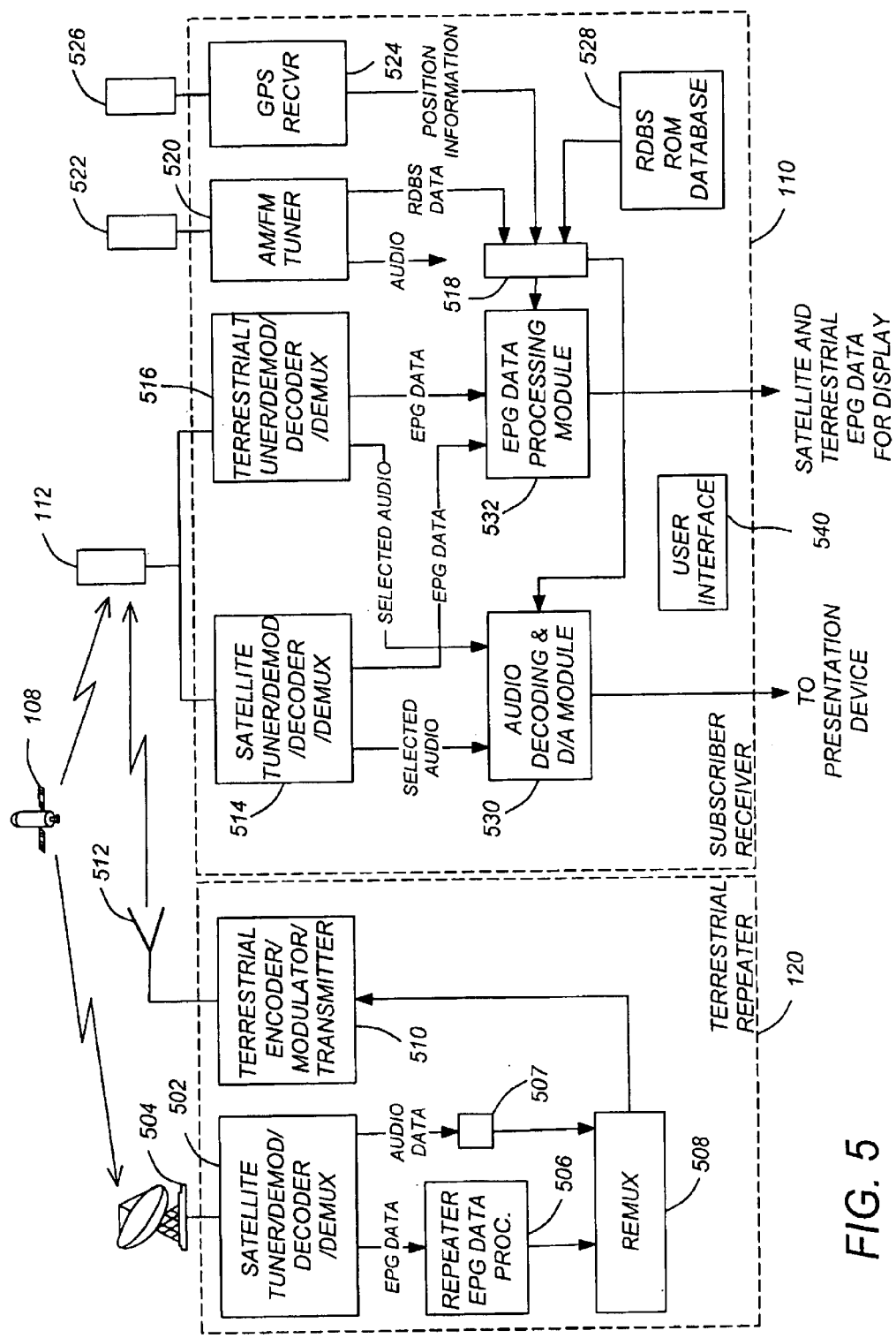
FIG. 5 is a block diagram of one embodiment of a repeater and a subscriber receiver.

FIG. 5 is a block diagram of one embodiment of the repeater 120 and the subscriber receiver 110. The repeater 120 comprises a repeater receiver 502 communicatively coupled to a repeater antenna 504. The repeater receiver 502 comprises a tuner, demodulator, decoder, and demultiplexer, to receive signals from the satellite 108. The satellite signal comprises national media programs (programs with primarily national interest) intended for reception in the national broadcast region and regional media programs (programs with largely localized interest) intended for reception in local broadcast regions 404. In one embodiment, the signal from the satellite also comprises electronic program guide (EPG) information describing the satellite national media programs and regional media programs, and associating each with a media channel. The EPG information may also include information for local AM and FM stations. EPG-related data is supplied to a repeater EPG data processor 506. Audio output is supplied to the processing module 507. The outputs of the EPG data processor 506 and the processing module 507 are remultiplexed in the multiplexer 508.

The multiplexer 508 accepts the EPG information and the audio data streams, and adds a local broadcast identifier (ID) to the data streams which are intended for reception in the local broadcast region serviced by the repeater 120. This local broadcast ID tells each satellite receiver its location (e.g. if a given ID can be received, the receiver is, by definition, in that region as viewed by the satellite system). In one embodiment, the local broadcast ID is simply appended to the packets representing the data stream.

Figure 6A:
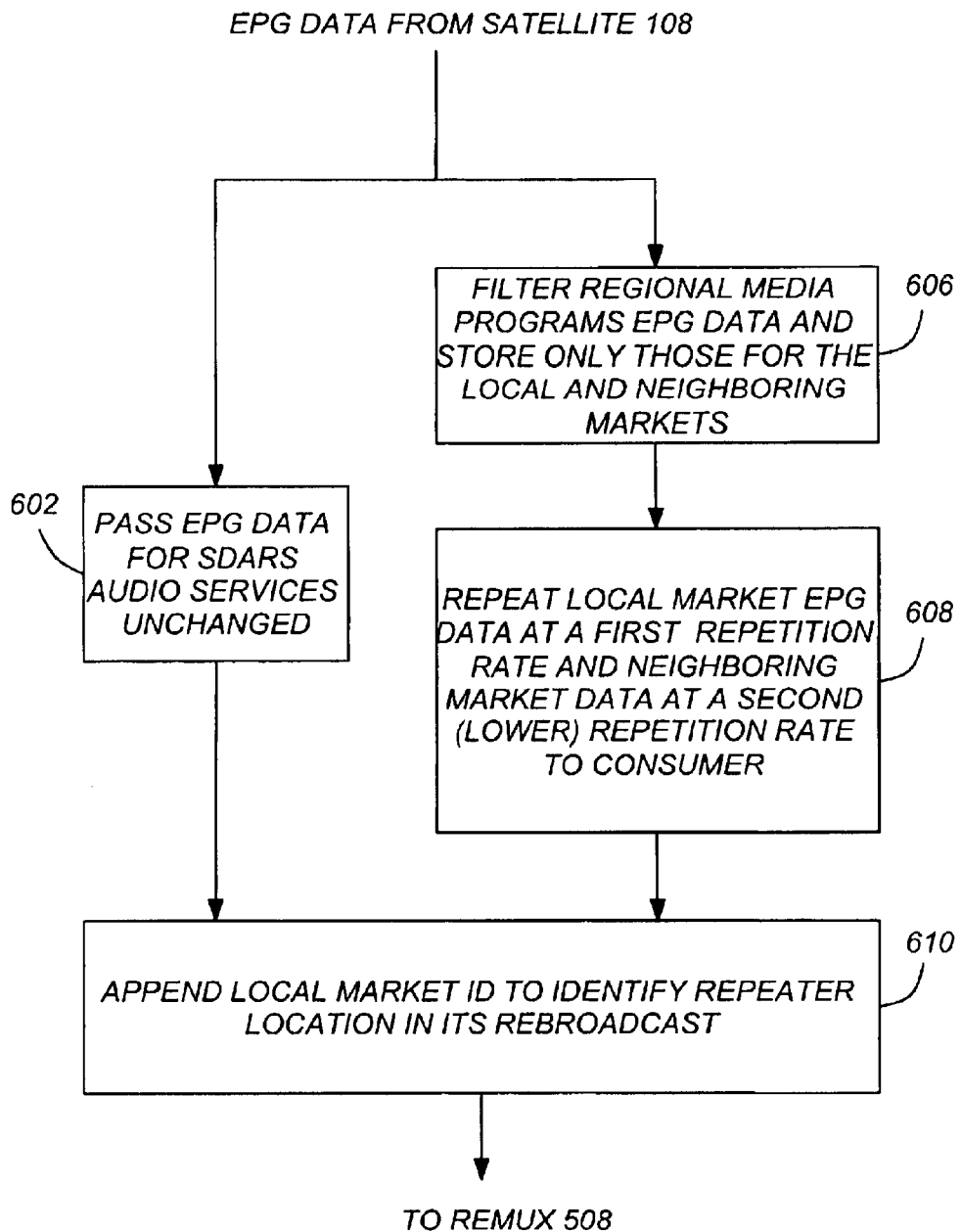
FIG. 6A is a flow diagram illustrating two alternative embodiments of the present invention.

FIG. 6A is a flow diagram illustrating two embodiments of the repeater EPG processing of the present invention. In the first alternative embodiment, EPG data received from the satellite 108 is passed to the subscriber receiver 110 unchanged 602, but a local market ID is appended 610 to the media programs to identify the repeater 112 location in the rebroadcast. In a second alternative embodiment, the regional media program EPG data is filtered 606 so that only the regional media programs for the local broadcast region 404 and neighboring local broadcast regions are stored in the repeater 112. This filtered EPG information is transmitted to subscriber receivers. By filtering the EPG information so that only the EPG information for the local markets (and, optionally, the neighboring markets) is provided, additional transmission bandwidth becomes available. This additional bandwidth can be used to transmit the EPG data at a higher repetition rate in the local broadcast region, and, optionally, a lower repetition rate in the neighboring region 608. Repetition rates may be further adjusted to account for local market demographics, the date and time of day. After the local broadcast ID is added to the regional media programs, the signals are provided to an encoder/modulator 510, and thence to a repeater transmit antenna 512 for transmission.

Figure 6B:
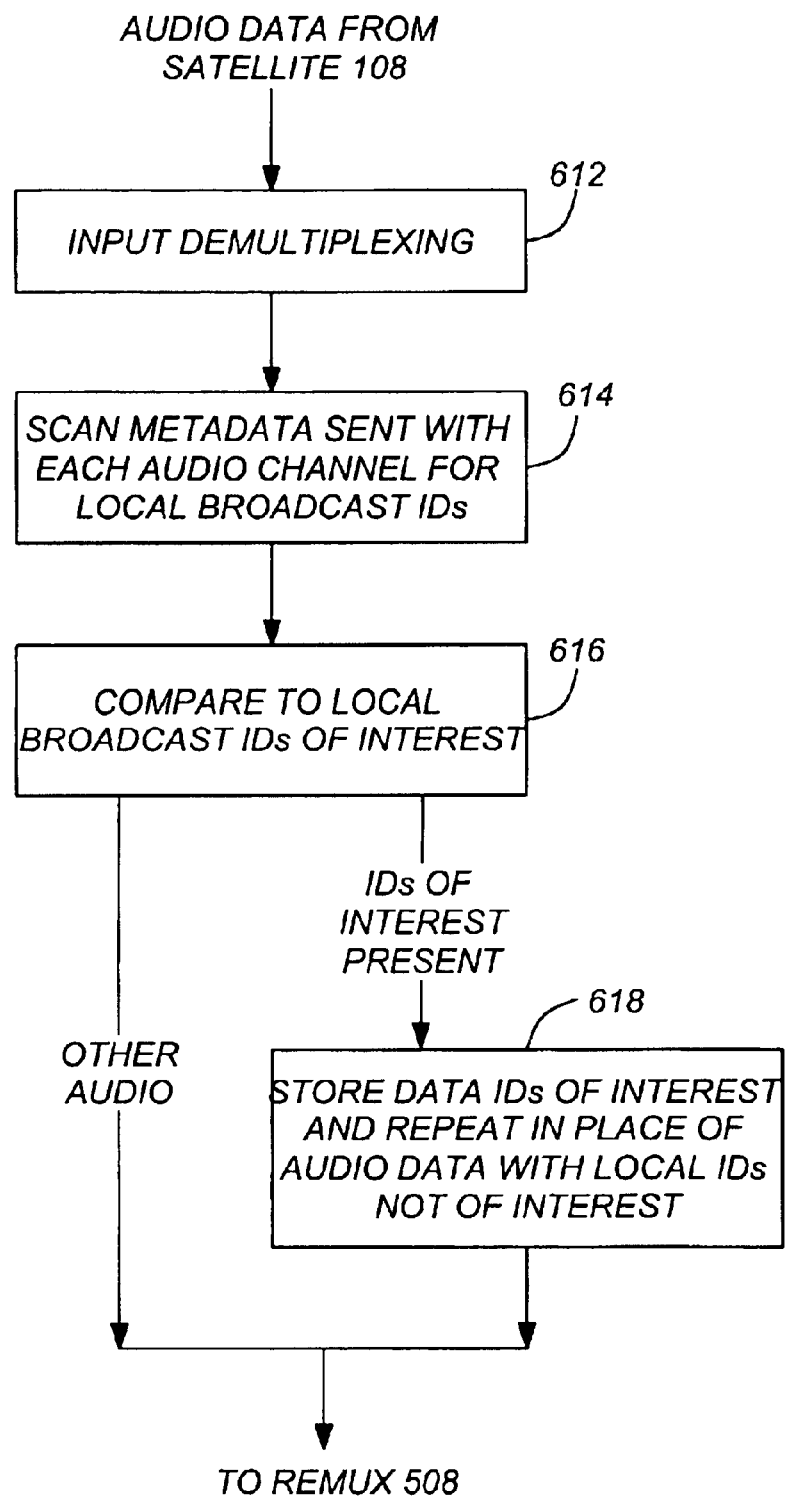
FIG. 6B is a flow diagram the audio repeater processing.

FIG. 6B is a flow diagram illustrating the audio repeater processing. Input demultiplexing 612 is performed by the demux 502. Metadata sent with each audio channel is scanned 614 for local broadcast IDs and compared 616 to local broadcast IDs of interest. Audio content with national interest (no local broadcast IDs) is then passed to the output multiplexer 508. Audio content with local interest (local broadcast IDs) is filtered by comparing 616 IDs included with the broadcast against the local broadcast ID of the repeater 120. Content of interest for the local market of the repeater is stored 618 (e.g. in random access memory or hard disk) and played out repeatedly in place of the local content intended for other local markets.

The subscriber receiver 110 comprises a first tuner module 514 and a second tuner module 516, each communicatively coupled to a subscriber receiver antenna 112. Alternatively, the first tuner module 514 and the second tuner module 516 could be coupled to different antennae. The first tuner module 514 comprises a tuner, a demodulator, a decoder, and a demultiplexer to receive the signal from the satellite 108 and separate that signal into an audio signal representing the media program on the user-selected channel, and EPG data. The second tuner module 516 comprises a tuner, a demodulator, a decoder, and a demultiplexer to receive the signal from the repeater 120 and separate that signal into an audio signal representing the media program selected on the user-selected channel, and EPG data from the repeater 120.

The subscriber receiver 110 also comprises a location module 518, which determines the local broadcast region 404 in which the subscriber receiver 110 is disposed. In one embodiment, the subscriber receiver 110 includes an AM/FM tuner 520 communicatively coupled to a suitable antenna 522.

Existing FM broadcasts have recently added an elementary channel information feature known as the Radio Broadcast Data System (RBDS). This feature provides less than one Kbps on each channel, and can be used to provide information about the radio station. This information can include, for example, the regional media provider's call letters (e.g. KUSC), media program currently being transmitted (e.g. NPR's MORNING EDITION), media channel category (e.g. "blues," "classical," or "data"). The EPGs for new digital services such as SDARS will be much more extensive in terms of the data available about the media channel and individual programs.

The AM/FM tuner 520 provides audio data for presentation to the user, and may also provide RBDS data. The RBDS data received by the AM/FM tuner 520 is compared to a RBDS database 528 to determine the local broadcast region 404 in which the receiver is disposed. For example, many radio stations broadcast their letter designation (e.g. KUSC) on RBDS. In this case, the information transmitted by the satellite 108 can include a table having a mapping from the KUSC to the regional media provider at the University of Southern California, and local broadcast region of Los Angeles. This data, when received, can be stored in the database 528 and used to determine the local broadcast region 404. The RDBS database can be periodically updated via the satellite 108. In another embodiment, the subscriber receiver 110 includes a global positioning system (GPS) receiver 524 communicatively coupled to a suitable antenna 526. The GPS receiver 524 can provide information regarding the position of the subscriber receiver 110 (for example, in the form of a latitude and longitude). In this embodiment, the location module 518 compares the latitude and longitude with a table mapping longitude and latitude to the local broadcast region 404. The location module 518 provides the local broadcast region information to a controller module 530 and to an EPG data processing module 532.

The controller module 530 uses the information provided by the location module 518 and the local market ID to determine which of the satellite's regional media programs should be presented to the user. Further, the EPG data processing module 532 uses the information provided by the location module 518 to determine which programs to present in an integrated EPG (presenting only those which are either national media programs or satellite or terrestrial regional media programs broadcast within the local broadcast region).

Figure 7A:
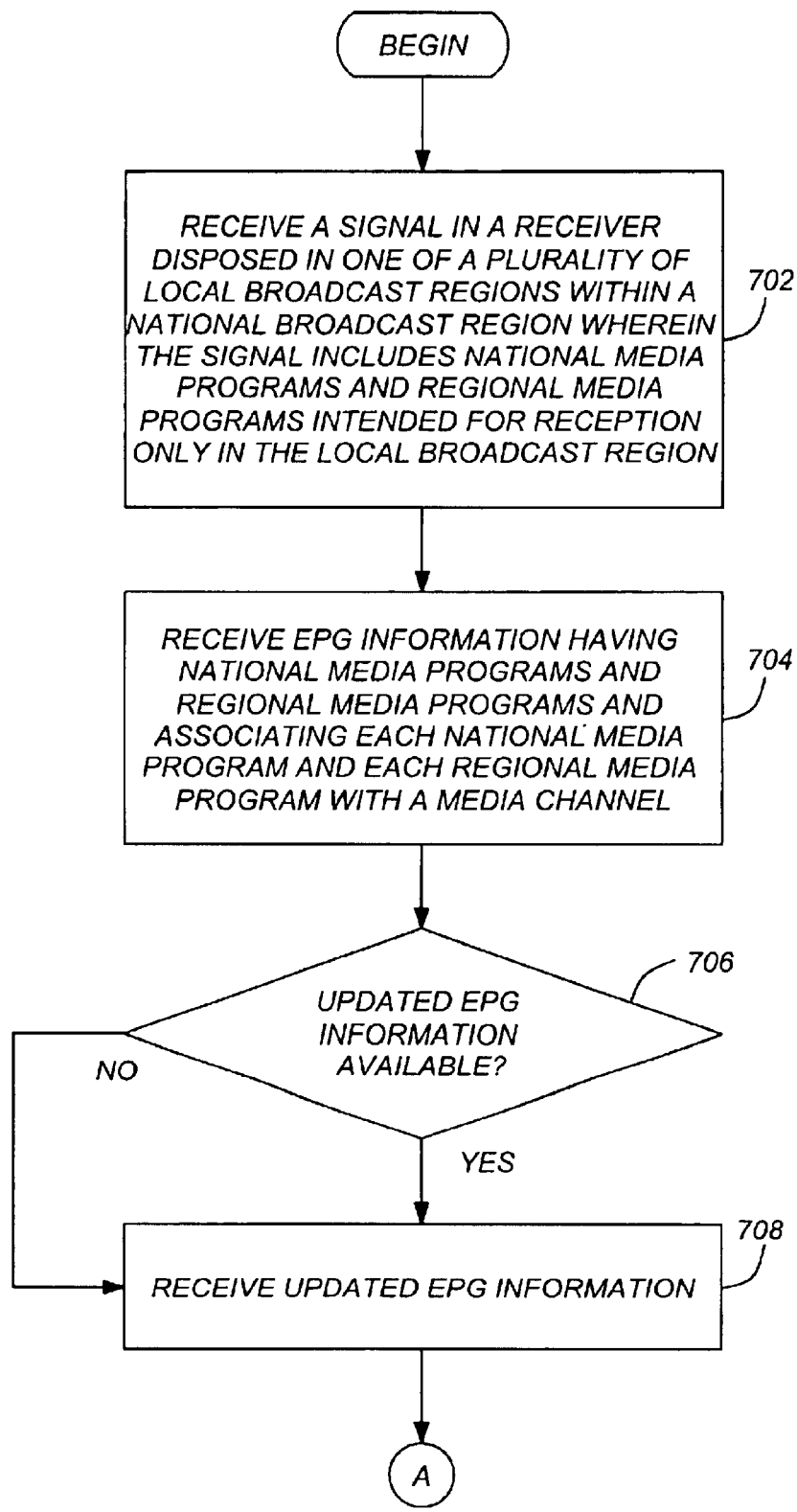
FIGS. 7A and 7B are flow charts presenting exemplary method steps used to practice one embodiment of the present invention.

FIG. 7A is a diagram showing exemplary process steps used to practice one embodiment of the present invention. A signal is received 702 in a receiver 110 disposed in one of a plurality of local broadcast regions 404A–404C within a national broadcast region 402. The signal includes national media programs intended for reception in the national broadcast region 402 and regional media programs intended for reception only in the local broadcast region (e.g. 404A). EPG information is also received 704. The EPG information includes information regarding national media programs and regional media programs, and associates these programs with media channels that can be selected by the user by use of the EPG. Typically, the EPG information is broadcast on a periodic basis to update the EPG presented by the subscriber receiver 110. Each succeeding broadcast of EPG information can comprise the entire EPG, or just the newer portions of the EPG. For example, the EPG information can be broadcast in a slow carousel, and can be stored in the subscriber receiver 110 for the current local broadcast region or all local broadcast regions. If updated EPG information is available, it is also received, as shown in blocks 706 and 708.

Figure 7B:
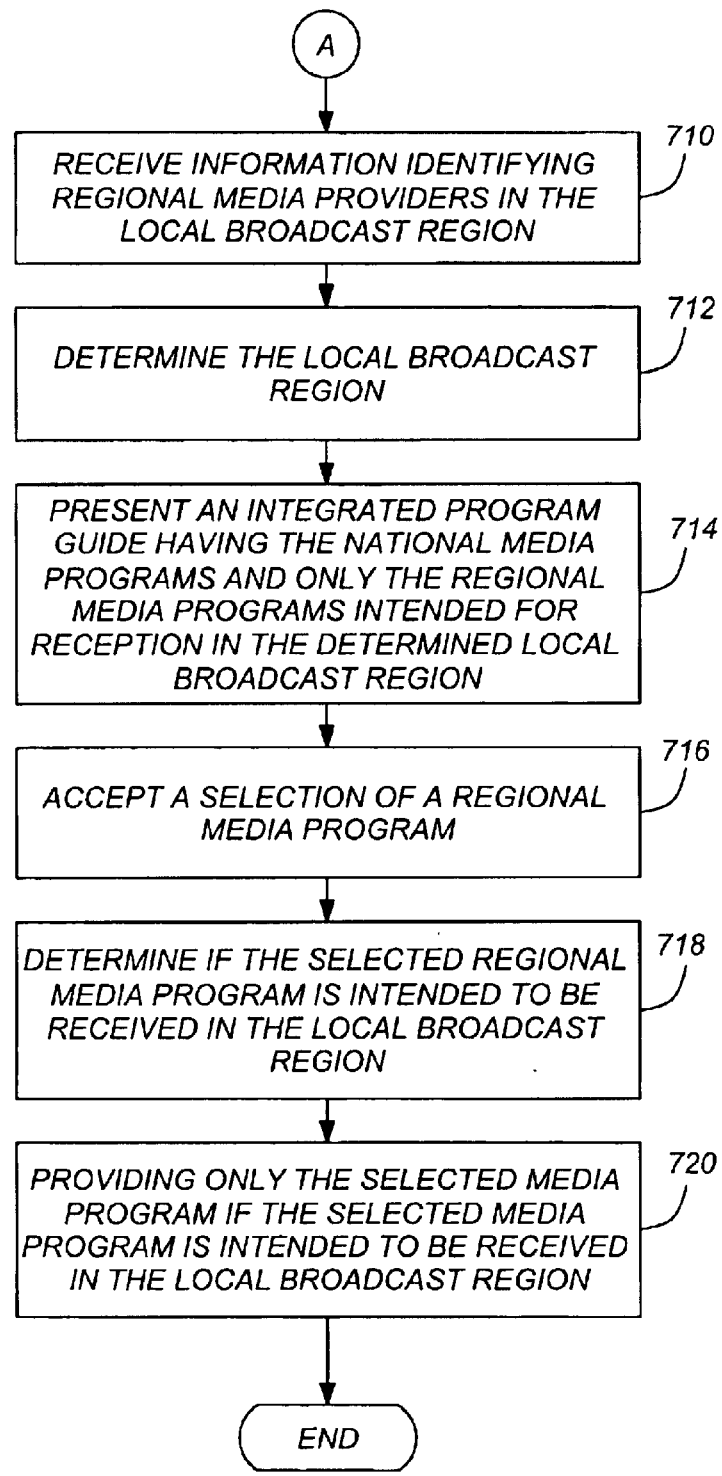

As shown in FIG. 7B, the subscriber receiver 110 also receives 710 information identifying regional media providers providing services in the local broadcast region. In one embodiment, this is accomplished by receiving a table listing the AM and FM stations available in each RBDS market. This table can change several times a day, as the RBDS stations change the RBDS transmission content or power levels. The table can also be updated to reflect the impact of weather and/or time of day on the size and shape of the local broadcast region 404 or service area. The table can also include sufficient information to distinguish stations operating at the same frequency.

With regard to either the information identifying regional media providers or the EPG information, data compression techniques can be used to reduce the size of the transmissions.

Next, the subscriber receiver 110 determines 712 the local broadcast region 404. As described above, this can be accomplished by the application of one or more techniques, including those that are identified below.

1) Identify the local broadcast region in which the receiver 110 is disposed by use of a look-up table mapping the latitude and longitude of the receiver 110 (as obtained from the GPS receiver 524) and local broadcast regions 404.

2) Identify the local broadcast region in which the receiver 110 is disposed by comparing the local market IDs received from the repeater 112.

3) Identify the local broadcast region by comparing received information regarding regional media providers (e.g. the call letters KUSC, as provided by RBDS) with a look-up table listing the expected information from each regional provider.

4) Identify the local broadcast region via a SDARS service authorization command. In this option, the satellite 108 transmits a command fixing the nominal location of the receiver.

Next, the subscriber receiver 110 presents 714 an integrated EPG having the national media programs and only the regional media programs that are intended for the local broadcast region identified using the logic in block 712. This can be accomplished as shown in FIGS. 8A and 8B.

Figure 8A:
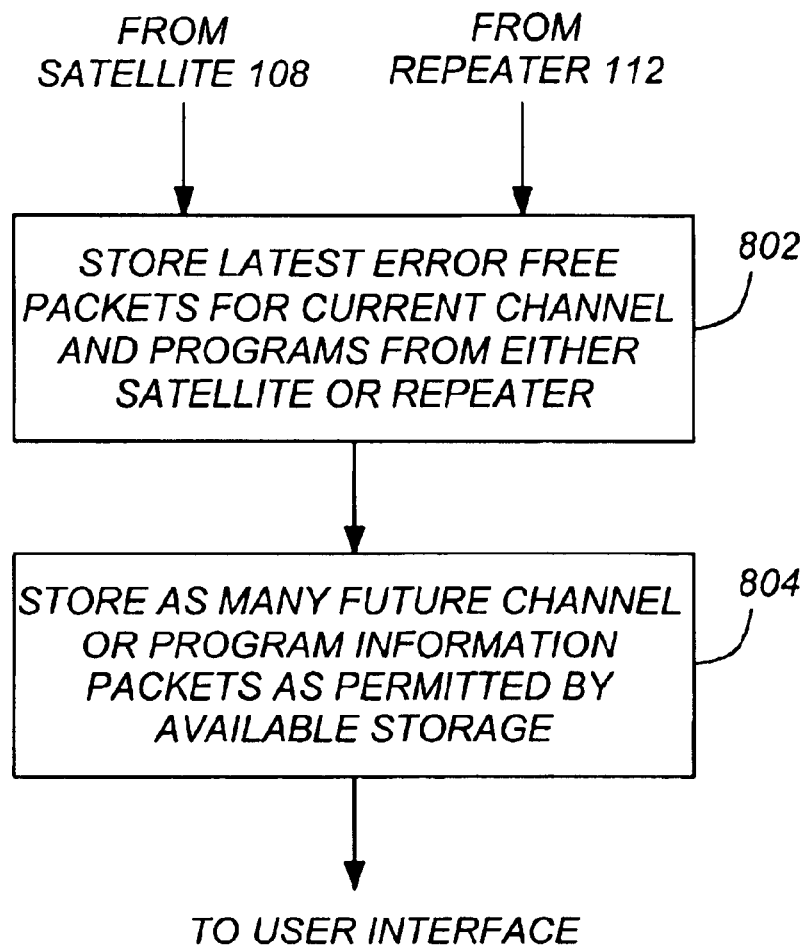
FIGS. 8A and 8B are flow charts presenting exemplary method steps useful in presenting an integrated EPG to the user.
Figure 8B:
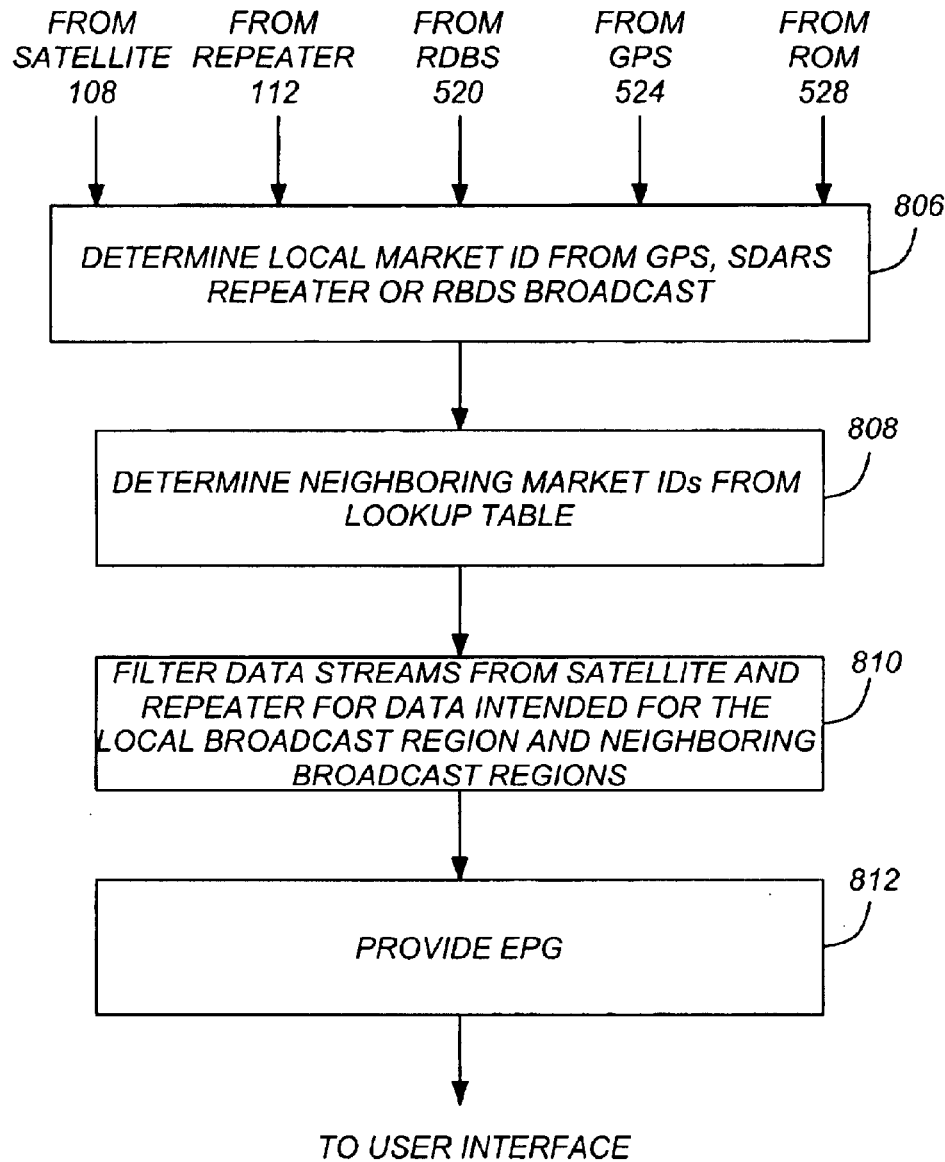

FIGS. 8A and 8B present illustrative method steps that can be used to present the integrated EPG. FIG. 8A presents one embodiment of the EPG processing for display of EPG elements provided by the satellite 108. The latest error free data packets having EPG data describing the channels and media programs are received from either the satellite 108 or the repeater 112 and stored 802. In one embodiment, each of the data packets transmitted to the subscriber receiver 110 includes a time tag that is used to determine which of the received EPG data packets represents the latest information. A determination as to the expected errors in the data packets can be performed using forward error control techniques described above. The resulting EPG is provided to a user interface 540 for presentation to the user. Subject to internal subscriber receiver 110 storage constraints, the received EPG channel and program information is stored 804.

FIG. 8B presents one embodiment of the EPG processing for regional media services. A local market ID is determined 806 using GPS receiver 524, the repeater 112, or an RBDS-capable tuner 520. Using a table broadcast by the satellite 108 or the repeater 112, and the local market ID, the local broadcast region (and optionally, neighboring local broadcast regions) are determined 808. This information is used to filter 810 data streams from the satellite 108 and the repeater 112, passing media programs that are intended for the local broadcast region (and optionally, neighboring broadcast regions). Finally, the EPG is provided 812 to a user interface 540 for presentation to the user.

Thus, an EPG is displayed for all available AM, FM and SDARS channels. Where a large display is available, the EPG may comprise a guide grid relating to channels and media programs. Where a single line display is available, the user interface 540 may comprise a horizontally scrolled channel and current program information. Further, if requested by the user, the EPG may present program information for upcoming programs.

Returning to FIG. 7B, the subscriber receiver 110 accepts 716 a selection of a media program. If the media program is a national media program, the program is presented to the user. If the media program is a regional media program, a determination 718 may be made to determine if the selected local media program is intended to be received in the local broadcast region. If the media program is not intended to be received in the local broadcast region, a message indicating as such is provided to the user, and the media program is not provided. If the selected media program is intended to be received in the local broadcast region, the selected media program is provided 720. In an alternative embodiment of the invention, the user is constrained to select media programs through the EPG, and the EPG presents only media programs that are available for viewing. In this embodiment, it is not required to evaluate the user's media program selection before providing it for use.

In a further embodiment, the user may select to receive all programs including regional programs intended for other regions. That is, the user may receive weather or other information for all localities rather than only for the user's local region.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of receiving regional media programs transmitted by regional media providers, comprising the steps of:
   receiving a signal in a receiver disposed in one of a plurality of local broadcast regions within a national broadcast region, wherein the signal includes national media programs intended for reception in the national broadcast region and regional media program intended for reception only in the local broadcast region;
   determining the local broadcast region; and
   providing only the regional media programs intended for reception in the determined local broadcast region; and
   wherein the national media programs and the regional media programs are transmitted by a satellite and only the regional media programs intended for reception in the local broadcast region are transmitted by a terrestrial repeater.

2. The method of claim 1, further comprising the step of providing national media programs.

3. The method of claim 1, further comprising the step of presenting an integrated electronic program guide (EPG) having the national media program and only the regional media programs intended for reception in the determined local broadcast region.

4. The method of claim 3, further comprising the step of receiving electronic program guide (EPG) information describing the national programs and regional media programs and associating each national media program and each regional media program with a media channel.

5. The method of claim 1, further comprising the step of:
   receiving information identifying regional media providers in the local broadcast region.

6. The method of claim 5, wherein the information identifies all regional media providers in the national broadcast region.

7. The method of claim 5, wherein the received information comprises a table of regional media providers.

8. The method of claim 5, further comprising the step of receiving updated information identifying regional media providers after the information identifying the regional media providers changes.

9. The method of claim 1, wherein the step of determining the local broadcast region comprises the steps of:
   determining a location of the receiver; and
   determining the local broadcast region from the location of the receiver and information stored im the receiver associating the location of the receiver with the local broadcast region.

10. The method of claim 9, wherein the location of the receiver is determined with a global positioning (GPS) receiver.

11. The method of claim 9, wherein the location is determined according to a latitude and longitude, and the information stored in the receiver is a table relating the latitude and longitude to the broadcast region.

12. The method of claim 1, wherein the step of determining the local broadcast region comprises the steps of:
   reading a local broadcast ID added to the regional media programs by the terrestrial repeater; and
   determining the local broadcast area from the local broadcast ID.

13. The method of claim 12, wherein the terrestrial repeater receives the signal from a satellite and transmits the signal having the local broadcast ID and the regional media programs to the receiver.

14. The method of claim 13, wherein the terrestrial repeater temporarily stores the regional programs intended for the region corresponding to its local broadcast ID and then retransmits the stored regional programs.

15. The method of claim 14, wherein the terrestrial repeater scans metadata transmitted with the signal to identify the regional media programs intended for reception in the local broadcast region.

16. The method of claim 14, wherein the terrestrial repeater stores and retransmits the regional media programs at a repetition rate.

17. The method of claim 16, wherein:
   the signal broadcast from a satellite comprises regional media programs intended for reception in a second local broadcast region; and a repetition rate of the regional media programs is selected to utilize a repeater transmission capacity that would otherwise have been used to transmit the regional media programs intended for reception in the second local broadcast region.

18. The method of claim 1, wherein the step of determining the local broadcast region comprises the steps of:

receiving information indicating the local broadcast region from the regional media provider.

19. The method of claim 18, wherein the information is received by a Radio Broadcast Data System-compliant tuner module.

20. The method of claim 19, wherein the information indicating the local broadcast receiver comprises the identity of a regional media provider in the local broadcast region, and the method further comprises the step of:

accessing information relating the identity of the regional media provider and the local broadcast region.

21. A receiver for receiving regional media programs in one of a plurality of local broadcast regions within a national broadcast region, comprising;

a first tuner module for receiving a first signal from a satellite, wherein the first signal comprises national media programs intended for reception in the national broadcast region and regional media programs intended for reception only in the local broadcast region;

a second tuner module for receiving a second signal from a repeater serving the local broadcast region, the second signal comprising a regional media program and a local broadcast ID;

a location module, for determining the local broadcast region, the location module comprising a radio broadcast data system (RDBS) compliant tuner for receiving information indicating the local broadcast region; and a controller module, for providing only the regional media programs intended for reception in the determined local broadcast region.

22. The receiver of claim 21, wherein:

the first signal further comprises electronic program guide (EPG) information; and an EPG data module for generating an integrated EPG having the national media programs and only the regional media programs intended for reception in the determined broadcast region.

23. The receiver of claim 21, wherein the location module comprises:

a global positioning (GPS) receiver, for providing receiver position information; and a memory, for storing information relating receiver position information with the local broadcast region.

24. The receiver of claim 21, further comprising a user control to enable reception of all regional media programs, including regional media programs not intended for reception in the local broadcast region.

* * * * *